US009838487B2

(12) United States Patent
Mak et al.

(10) Patent No.: US 9,838,487 B2
(45) Date of Patent: Dec. 5, 2017

(54) METHOD AND SYSTEM FOR MAPPING, TRACKING, AND TRANSPORTING OF CONTENT DATA ON A WEBPAGE

(71) Applicant: Disney Enterprises, Inc., Burbank, CA (US)

(72) Inventors: Innate Mak, Chino Hills, CA (US); Yuan Wang, Walnut, CA (US); Wen Qu, Monterey Park, CA (US); Jiancheng Ma, Hacienda Heights, CA (US); Dexter Lee, Palos Verdes Estates, CA (US); Brian De Boer, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 423 days.

(21) Appl. No.: 14/161,519

(22) Filed: Jan. 22, 2014

(65) Prior Publication Data
US 2015/0095409 A1    Apr. 2, 2015

Related U.S. Application Data

(60) Provisional application No. 61/883,767, filed on Sep. 27, 2013.

(51) Int. Cl.
| | |
|---|---|
| *G06F 15/16* | (2006.01) |
| *H04L 29/08* | (2006.01) |
| *G06Q 30/02* | (2012.01) |
| *H04N 1/00* | (2006.01) |
| *G06F 12/14* | (2006.01) |

(52) U.S. Cl.
CPC .......... *H04L 67/22* (2013.01); *G06Q 30/0271* (2013.01); *H04L 67/02* (2013.01); *G06F 12/14* (2013.01); *H04L 29/08* (2013.01); *H04L 67/146* (2013.01); *H04N 1/00461* (2013.01)

(58) Field of Classification Search
None
See application file for complete search history.

(56) References Cited

U.S. PATENT DOCUMENTS

| | | | |
|---|---|---|---|
| 5,862,347 A | 1/1999 | Suzuki | |
| 7,685,191 B1 | 3/2010 | Zwicky | |
| 8,180,376 B1 | 5/2012 | Merritt | |
| 8,365,062 B2 | 1/2013 | Seolas | |
| 9,203,908 B2 * | 12/2015 | Wogulis | .................. H04L 67/16 |
| 2004/0015580 A1 * | 1/2004 | Lu | ........................ G06F 11/3495 709/224 |
| 2005/0240599 A1 * | 10/2005 | Sears, Jr. | .......... G06F 17/30867 |
| 2007/0075915 A1 | 4/2007 | Cheon | |

(Continued)

*Primary Examiner* — Viet Vu
*Assistant Examiner* — James Edwards
(74) *Attorney, Agent, or Firm* — Farjami & Farjami LLP

(57) ABSTRACT

There is provided a system and method for optimizing mapping, tracking, and transporting of content data on a webpage using client-side technologies. The system including a server and a client device, the client device configured to retrieve content data from a first webpage accessed from the server, assemble a cookie using the content data from the first webpage, store the cookie in a memory of the client device, detect a second webpage accessed, retrieve the cookie in response to detecting the second webpage, extract the content data from the cookie, and load the content data on the second webpage.

14 Claims, 5 Drawing Sheets

(56) References Cited

U.S. PATENT DOCUMENTS

| | | | |
|---|---|---|---|
| 2009/0094638 A1* | 4/2009 | Brier | G06Q 30/02 |
| | | | 725/34 |
| 2009/0241016 A1 | 9/2009 | Kihara | |
| 2010/0064234 A1* | 3/2010 | Schreiber | G06Q 30/0273 |
| | | | 715/760 |
| 2011/0016197 A1 | 1/2011 | Shiimori | |
| 2011/0268185 A1 | 11/2011 | Watanabe | |
| 2011/0271175 A1* | 11/2011 | Lavi | G06F 17/30905 |
| | | | 715/234 |
| 2012/0054815 A1 | 3/2012 | Ushimaru | |
| 2012/0159307 A1 | 6/2012 | Chung | |
| 2012/0311091 A1 | 12/2012 | Dingier | |
| 2013/0031464 A1 | 1/2013 | Mess | |
| 2013/0138506 A1* | 5/2013 | Zhu | G06Q 30/0251 |
| | | | 705/14.53 |

\* cited by examiner

METHOD AND SYSTEM FOR MAPPING, TRACKING, AND TRANSPORTING OF CONTENT DATA ON A WEBPAGE

RELATED APPLICATIONS

The present application claims the benefit of and priority to a U.S. Provisional Patent Application Ser. No. 61/883,767, filed Sep. 27, 2013 and titled "Optimizing Loading of Content Data on a Webpage by Utilizing Client-Side Technology," which is hereby incorporated by reference in its entirety into the present application.

BACKGROUND

Current technology allows webpages to be designed with a variety of content data including images, advertisements, chat, links, movies, and games. These webpages are designed as steteless secure silos that do not allow the transfer of content data from one webpage to another webpage. However, there are many cases where it would be desirable for a user to retain or transfer the content data between webpages. One approach to allowing transferring of content data between webpages is to embed the content data in the uniform resource locator (URL) as the user travels from one webpage to another webpage. However, this approach gets bodded down fairly quickly.

SUMMARY

The present disclosure is directed to method and system for mapping, tracking, and transporting of content data on a webpage, substantially as shown in and/or described in connection with at least one of the figures, as set forth more completely in the claims.

DETAILED DESCRIPTION

Figure 1:
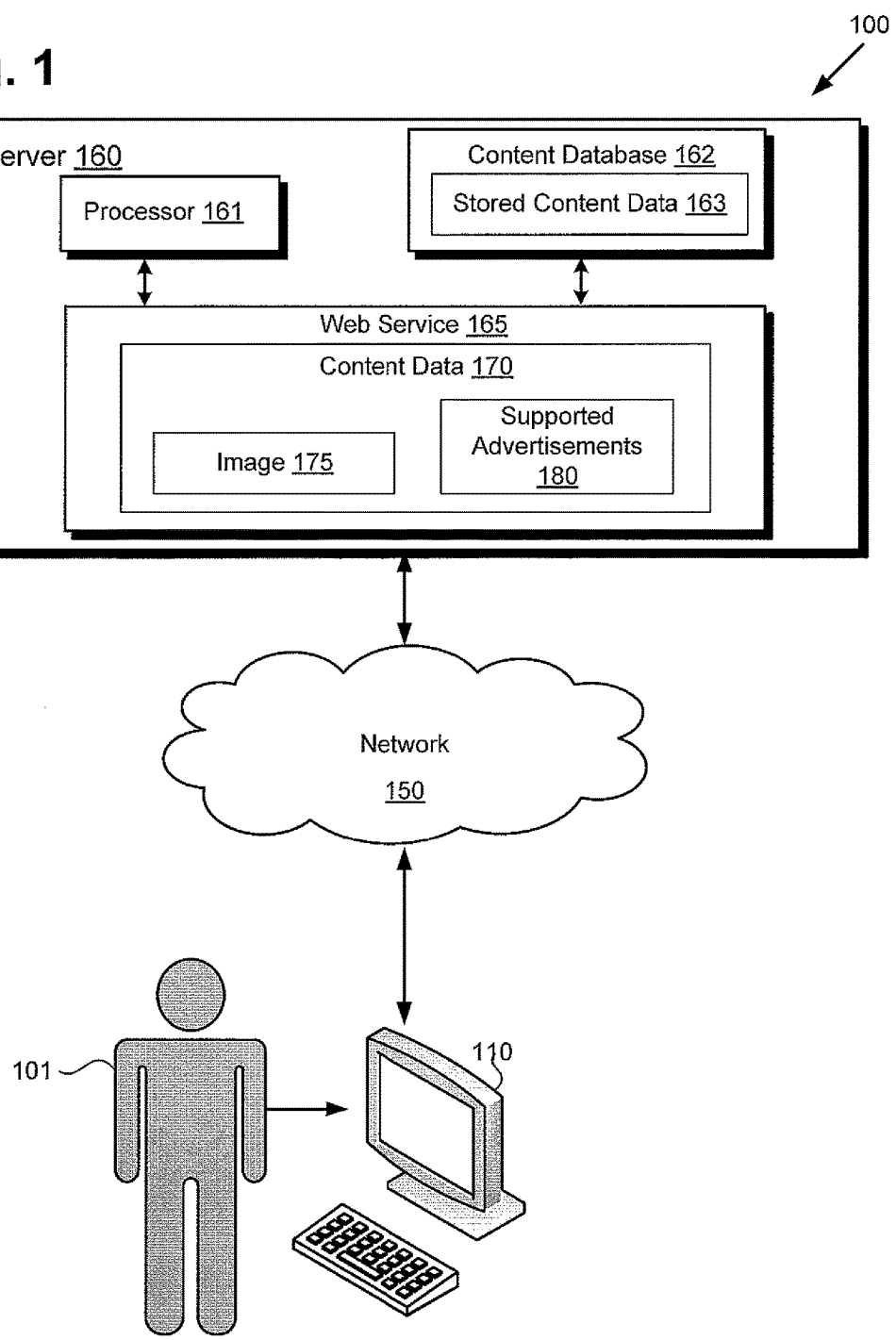
FIG. 1 presents a system for accessing web content over a network, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for accessing web content over a network, according to one implementation of the present disclosure. System 100 includes user 101, client device 110, network 150, and server 160. Server 160 includes processor 161, content database 162, and web service 165. Web service 165 includes content data 170, which includes image 175 and supported advertisements 180. Content database 162 includes stored content data 163.

It is noted that although client device 110 is represented as a personal computer (PC) in FIG. 1, in other implementations, client device 110 may include another type of mobile or stationary personal communication device or system, such as a tablet computer, mobile telephone, personal digital assistant (PDA), gaming console, or home entertainment system, for example.

As illustrated in FIG. 1, server 160 includes processor 161, content database 162, and web service 165. Processor 161 may be configured to access content database 162 to store received input or to execute commands, processes, or programs associated with web service 165. Processor 161 may correspond to a processing device, such as a microprocessor or similar hardware processing device, or a plurality of hardware devices. For example, processor 161 may correspond to an Intel processor or an AMD processor. However, in other implementations processor 161 refers to a general processor capable of performing the functions required of server 160.

According the implementation of FIG. 1, user 101 may utilize client device 110 and network 150 to access web service 165 of server 160. Web service 165 may include a website or webpage controlled and provided by server 160. As shown in FIG. 1, web service 165 includes content data 170, which includes both image 175 and supported advertisements 180. However, the implementation of FIG. 1 is not limited to content data 170 only including image 175 and supported advertisements 180. In other implementations, content data 170 may include, but is not limited to, an advertisement, image, text, video, link, game, or application.

As shown in FIG. 1, web service 165 may be accessed through network 150. Alternatively, web service 165 may reside on a server supporting a local area network (LAN), or be included in another type of limited distribution network. In another implementation, web service 165 may be stored in a non-transitory storage device, e.g. a computer-readable storage medium such as a computer hard-drive, computer based random-access memory (RAM), or a portable memory device such as a compact disc read-only memory (CD-ROM) or external Universal Serial Bus (USB) connected memory, for example.

As further shown in FIG. 1, web service 165 may access content database 162, which may include stored content data 163. Like content data 170 discussed above, stored content data 163 may include, but is not limited to, an advertisement, image, text, video, link, game, or application. Web service 165 may then utilize stored content data 163 in content database 162 and provide stored content data 163 with web service 165. For example, stored content data 163 may include advertisements and web service 165 may access the advertisements in stored content database 162. Web service 165 may then provide the advertisements with a webpage being accessed by user 101 of client device 110.

It should be noted that in the implementation of FIG. 1, server 160 includes both content database 162 and web service 165, however, the implementation of FIG. 1 is not limiting to server including both content database 162 and web service 165. In other implementations, either content database 162 or web service 165 may be stored on a second server separate from server 160, which server 160 can access through network 150. For example, if content database 162 is stored on a second server separate from server 160, server 160 would be able to access content database 162 on the second server through network 150.

Figure 2:
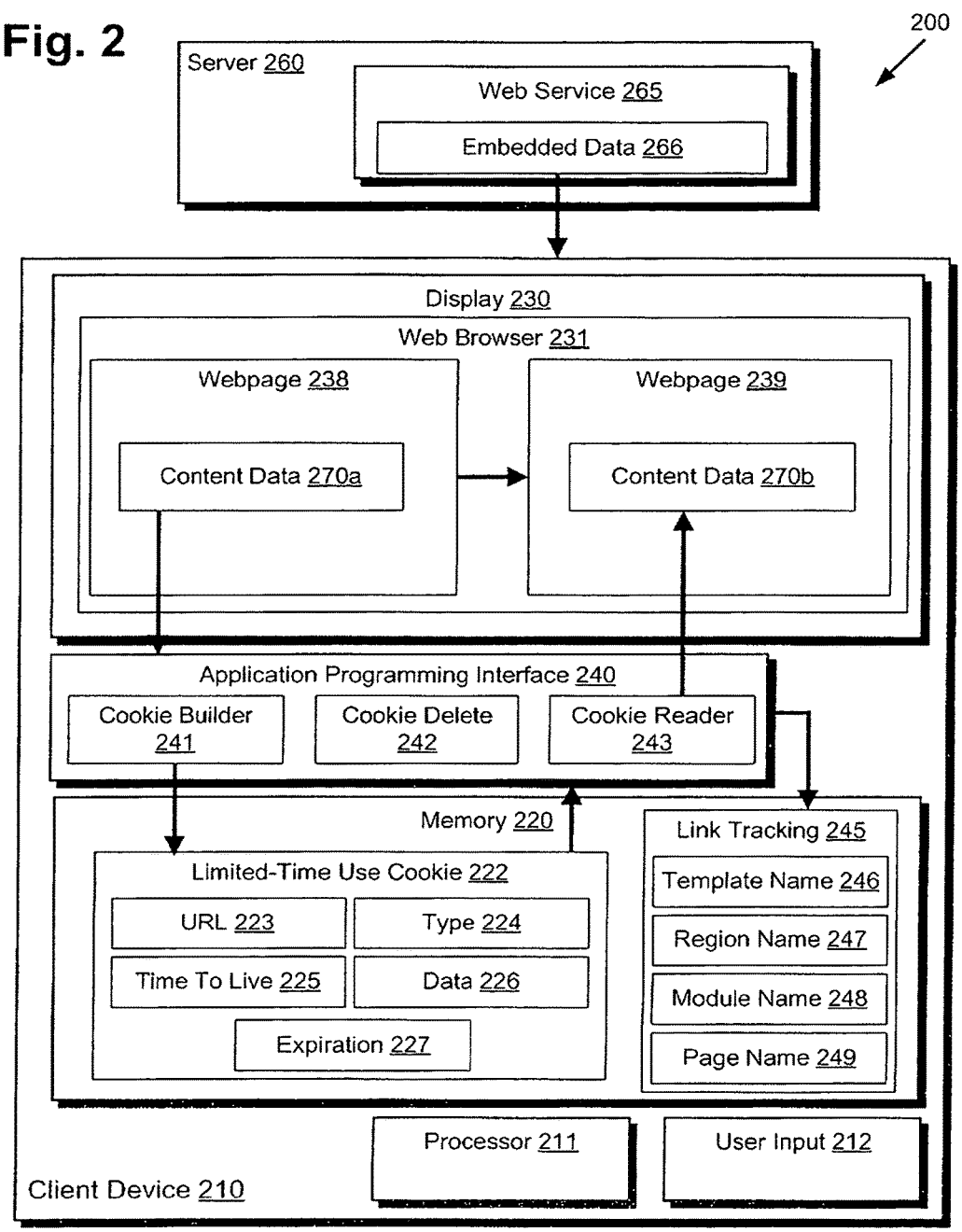
FIG. 2 presents a system for client-side content data mapping, tracking, and transportation, according to one implementation of the present disclosure.

FIG. 2 presents a system for client-side content data mapping, tracking, and transportation, according to one implementation of the present disclosure. System 200 includes client device 210 and server 260. Client device 210 includes processor 211, control unit 212, memory 220, display 230, and application programming interface (API) 240. Memory 220 includes limited-time use cookie 222 and link tracking 245. Limited-Time use cookie 222 includes URL 223, type 224, time to live 225, data 226, and expiration 227. Link tracking 245 includes template name 246, region name 247, module name 248, and page name 249. Display 230 includes web browser 231. Web browser 231 includes webpage 236, which includes content data 270a, and webpage 239, which includes content data 270b. API 240 includes cookie builder 241, cookie delete 242, and cookie reader 243. Server 260 includes web service 265, which includes embedded data 266.

As shown in FIG. 2, client device 210 includes display 230 and user input 212. User input 212 may include, for example, a keyboard, a mouse, a game controller, a touchscreen input, a thermal and/or electrical sensor, or any other device capable of accepting user input for use with client device 210. Display 230 may comprise a liquid crystal display (LCD) screen built into client device 210. In alternative implementations of the present disclosure, display 230 may be another type of display hardware, such as cathode-ray tubes (CRT) monitors. In yet other implementations, display 230 may also be touch sensitive and may serve as user input 212. Moreover, display 230 and user input 212 may be externally attached to client device 210 through physical or wireless connection.

Client device 210 further includes processor 211 and memory 220. Processor 211 may be configured to access memory 220 to store received input or to execute commands, processes, or programs stored in memory 220, such as application programming interface 240. Processor 211 may correspond to a processing device, such as a microprocessor or similar hardware processing device, or a plurality of hardware devices. However, in other implementations processor 211 refers to a general processor capable of performing the functions required of client device 210. Memory 220 is a sufficient memory capable of storing commands, processes, and programs for execution by processor 211. Memory 220 may be instituted as ROM, RAM, flash memory, or any sufficient memory capable of storing a set of commands. In other implementations, memory 220 may correspond to a plurality memory types or modules. Memory 220 may also be protected to prevent outside manipulation of memory 220 or specific portions of memory 220.

As illustrated in FIG. 2, web service 265 of server 260 includes embedded data 266. Embedded data 266 is metadata that is dynamically embedded by server 260 in webpages that are accessed by client devices, such as webpage 238 and webpage 239 accessed by client device 210. The metadata of embedded data 266 is embedded in the webpages on a per module and per region basis. For example, if a webpage includes a chat module that can either be located in the main area of the webpage or the right rail of the webpage, embedded data 266 would be inserted as metadata inside the chat module. The metadata would then specify that the chat module belongs to the specific portion and the specific region of the webpage, such as the main area or the right rail. This allows server 260 to target specific modules for page-to-page communications. For another example, a module on a cast member detail webpage can send data to a chat module located on the right rail of a video landing webpage so that the chat window would be pre-populated with a list of the user's favorite cast members.

Also illustrated in FIG. 2, web browser 231 includes two webpages, webpage 238 and webpage 239. It should be noted that display 230 may not be displaying both webpage 238 and webpage 239 concurrently. For example, a user of client device 210 may first visit webpage 238, using web browser 231, and interact with content data 270a on webpage 238. The user may then click on a link or type in a new web address to get to webpage 239. Webpage 239 could be associated with webpage 238, such as hosted by the same server or part of the same website as webpage 238, or webpage 239 may be completely separate from webpage 238. In either case, as illustrated in FIG. 2, webpage 239 includes content data 270b, which corresponds to content data 270a from webpage 238. For example, content data 270a and content data 270b may both include, but are not limited to, the same advertisement, image, text, video, link, game, chat, or application. Content data 270a was thus transferred as content data 270b from webpage 238 to webpage 239 using client-side solutions, as discussed in more detail below.

Also illustrated in FIG. 2, device 210 includes API 240. API 240 may be part of a JavaScript framework and is used to transport content data from a first webpage to a second webpage. As illustrated in FIG. 2, API 240 includes cookie builder 241, cookie delete 242, and cookie reader 243. In order for API 240 to transport content data between webpages, API 240 first scrapes the data from the first webpage, such as content data 270a from webpage 238, and executes cookie builder 241 to construct a cookie. For example, API 240 scrapes together content data 270a from webpage 238 and utilizes cookie builder 241 to construct limited-time use cookie 222, which is stored in memory 220. Cookie builder 241 assembles limited-time use cookie 222 by creating a hash for the destination page URL and storing the data for the cookie. For example, building a cookie for ABC.com may look as follows:

abcdm.abccom.Aperture.buildCookie(url, type, ttl, obj, expires).

As illustrated above and in FIG. 2, limited-time use cookie includes URL 223, type 224, time to live 225, data 226, and expiration 227. URL 223 is the URL of the target page and may be hashed using RC4 encryption to create the name of the cookie. Type 224 is a string value representing the type of data being passed along, so that the data is handled appropriately. Time to live 225 is the time for the data object to live with a default of one cycle. For example, time to live 225 is not a measurement of time, but an abstract number that can be decremented each time the cookie is read by API 240. Data 226 may be the content data to be stored along with type 224, or may be the entire data of the cookie if no type 224 is set. For example, data 226 may be a JavaScript Object Notation. Expiration 227 is a measurement of time for when the cookie will expire. For example, expiration 227 may be set as a standard time, such as in minutes, for when the cookie is deleted from memory 220.

Next, Cookie reader 243 of API 240 is used to parse through limited-time use cookie 222 and extract the stored content data. For example, if a user of client device 210 moves from webpage 238 to webpage 239, API 240 utilizes cookie reader 243 to extract limited-time use cookie 222 from memory 220, and parses through the content data stored on limited-time use cookie 222, such as content data 270*a* stored from webpage 238. API 240 then loads the content data extracted from limited-time use cookie 222 onto the webpage the user is loading. For example, API 240 utilizes cookie reader 243 to load content data 270*b* on webpage 239, where content data 270*b* was saved as data 226 in limited-time use cookie 222. As discussed above, content data 270*b* corresponds to content data 270*a* from webpage 238. When API 240 is finished, webpage 239 will display at least some of the same content data as was displayed on webpage 238.

An example of reading a cookie for ABC.com may look as follows:

abcdm.abccom.Aperture.readCookie(type, url, isDecrement).

In the above example, cookie reader 243 includes type, URL, and IsDecrement. Type is a string value for the type of cookie to lookup. URL is the URL or name of the cookie to be read. IsDecrement is the Boolean value to decrement from time to live 225 with a counter of one. As such, cookie reader 243 can be used to decrement the cookie after extracting the stored content data. For example, cookie reader 243 may set time to live 225 of limited-time use cookie 222 to zero after cookie reader 243 extracts the content data stored on limited-time use cookie 222. As discussed above, time to live 225 for most cookies has a cycle of one. Therefore, most cookies are only read once before their cycle is set to zero, thus deleting the cookies from memory 220.

Cookie delete 242 is used to delete any cookies stored in memory 220. For example, if limited-time use cookie 222 was never read by cookie reader 243, cookie delete 242 can be used to delete limited-time use cookie 222 from memory 220.

Also illustrated in FIG. 2 is link tracking 245 stored in memory 220 of client device 210. Link tracking 245 is a comprehensive link tracking mechanism that tracks all links on a webpage and gathers information on the module, region, and page that was clicked on for tracking purposes. For example, API 240 can scrape all the data together corresponding to a users interaction with a webpage and store that interaction data in link tracking 245. As illustrated in FIG. 2, link tracking 245 includes template name 246, region name 247, module name 248, and page name 249.

Figure 3:
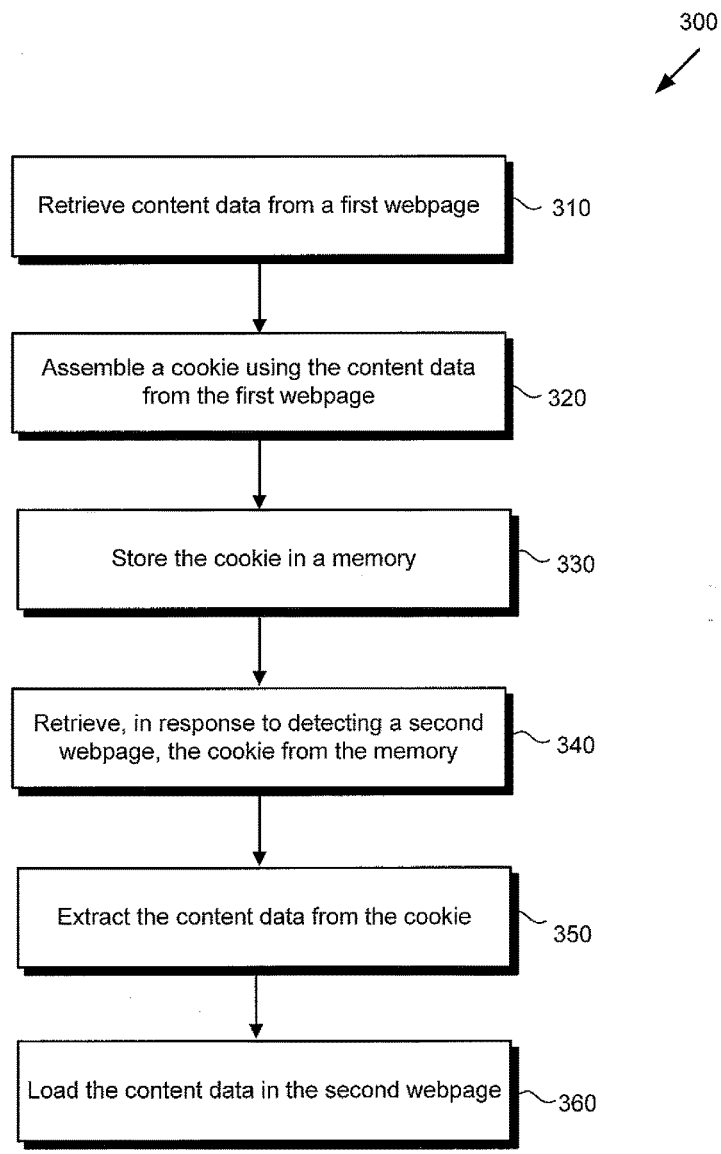
FIG. 3 presents a flowchart illustrating a method for client-side content data mapping, tracking, and transportation, according to one implementation of the present disclosure.

FIG. 3 presents a flowchart illustrating a method for client-side content data mapping, tracking, and transportation, according to one implementation of the present disclosure. The approach and technique indicated by flowchart 300 are sufficient to describe at least one implementation of the present disclosure, however, other implementations of the disclosure may utilize approaches and techniques different from those shown in flowchart 300. Furthermore, while flowchart 300 is described with respect to FIG. 2, the disclosed inventive concepts are not intended to be limited by specific features shown and described with respect to FIG. 2. Furthermore, with respect to the method illustrated in FIG. 3, it is noted that certain details and features have been left out of flowchart 300 in order not to obscure the discussion of inventive features in the present application.

Flowchart 300 includes retrieving content data from a first webpage (310). For example, processor 211 of client device 210 can execute API 240 in order to retrieve content data 270*a* from webpage 238. As discussed above, content data 270*a* may include, but is not limited to, an advertisement, image, text, video, link, game, or application.

Flowchart 300 also includes assembling a cookie using the content data from the first webpage (320). For example, processor 211 of client device 210 may execute API 240 and utilize cookie builder 241 to assemble limited-time use cookie 222 using content data 270*a*. As discussed above, limited-time use cookie 222 includes URL 223, type 224, time to live 225, data 226, and expiration 227. Flowchart 300 also includes storing the cookie in a memory (330). For example, once cookie builder 241 has assembled limited-time use cookie 222, processor 211 of client device 210 can store limited-time use cookie 222 in memory 220 of client device 210.

Flowchart 300 also includes retrieving, in response to detecting a second webpage, the cookie from the memory (340). For example, processor 211 of client device 210 may detect the loading of webpage 239 in web browser 231. In response, processor 211 executes API 240 to retrieve limited-time use cookie 222 from memory 220. In one implementation, detecting a second webpage may include the user of client device 210 clicking on a different reference tab on web browser 231. For example, webpage 238 may be referenced by a first tab and webpage 239 may be referenced by a second tab. The user may then switch from webpage 238 to webpage 239 by clicking on the second tab using user input 212. In other implementations, detecting a second webpage may include the user of client device navigating away from the first webpage by clicking on a link, typing in a new web address in a search field, or opening a new webpage. For example, the user may navigate away from webpage 238 by clicking on a link on webpage 238 that takes the user to webpage 239.

Flowchart 300 also includes extracting the content data from the cookie (350). For example, processor 211 of client device 210 can execute API 240 and utilize cookie reader 242 to extract content data 270*b* from limited-time use cookie 240. In the implementation of FIG. 2, as discussed above, content data 270*a* corresponds to content data 270*b*. As such, content data 270*a* retrieved from webpage 238 will be the same as content data 270*b* extracted and retrieved from limited-time use cookie 222.

It should be noted that when extracting content data 270*b* from limited-time use cookie 240, processor 211 of client device 210 can target content data 270*b* to be received by both a specific webpage and a specific module on that webpage. For example, content data 270*b* may be targeted towards webpage 239 specifically. In such an example, processor 211 will extract content data 270*b* from limited-time use cookie 240 and load content data 270*b* at some location on webpage 239. For another example, content data 270*b* may be targeted towards a specific module on webpage 239, such as a chat module. In such an example, processor 211 will extract content data 270*b* from limited-time use cookie 240 and load content data 270*b* in the chat module of webpage 239. As such, webpage 239 is not the recipient of content data 270*b* and will thus ignore the transport of content data 270*b*. However, the chat module of webpage 239 will be the recipient of content data 270 and content data 270 will be directly loaded in the chat module.

Flowchart 300 also includes loading the content data on the second webpage (360). For example, processor 211 of client device 210 can load content data 270*b* onto webpage 239. By loading content data 270*b* onto webpage 239, webpage 239 will display at least some of the same content as was displayed on webpage 238, or content data 270*b*.

Figure 4:
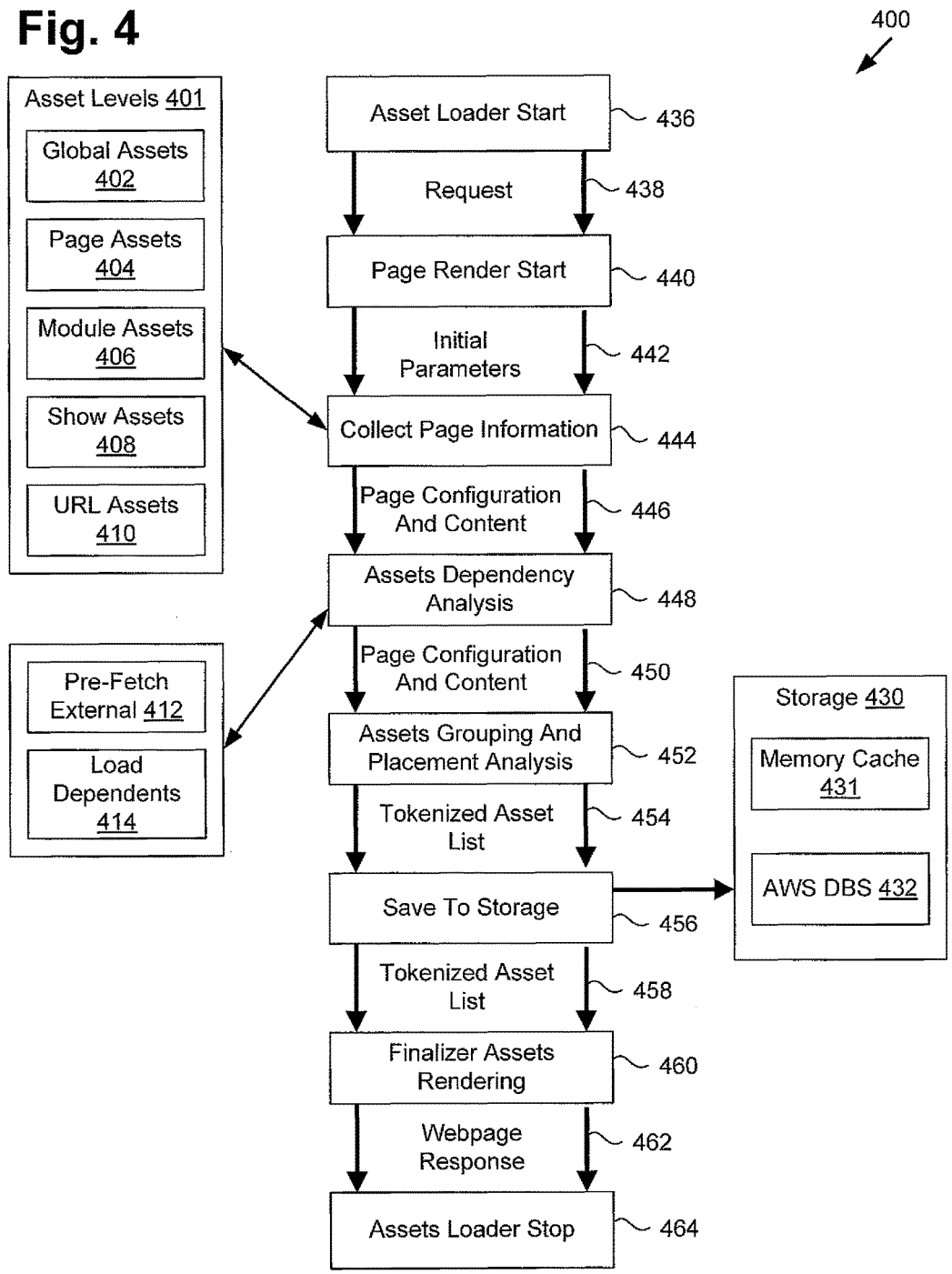
FIG. 4 presents a flowchart illustrating a method for loading asset universal resource locators (URLs) on a webpage after triggering a loading of the webpage, according to one implementation of the present disclosure.

FIG. 4 presents a flowchart illustrating a method for loading asset URLs on a webpage after triggering a loading of the webpage, according to one implementation of the present disclosure. Flowchart 400 is the first step to optimizing asset downloads for large complex websites and includes loading assets based on dependencies. Assets are loaded depending on certain variables, which include the platform, environment, business units, theme and/or color scheme, security, and code placement locations of the websites.

Flowchart 400 includes starting of the asset loader (436). Next, a request is made for loading of a webpage (438), which starts the page rendering (440). For example, a user may try to load an ABC webpage, which starts the page generation of the requested webpage. Next, the initial parameters are tracked for the requested webpage using the URL of the webpage (442). For example, and continuing with a user requesting an ABC webpage, each of the parameters for the ABC webpage are tracked from the URL of the webpage. Furthermore, additional parameters are searched for using the URL parameters.

Next, the page information for the requested page is collected (444). Collecting page information includes looking through the requested webpage and finding all the different modules that are included on the webpage, where each module includes a definition file. The definition file describes the assets needed for that module, where assets come in different levels. As illustrated in FIG. 4, asset levels 401 include global assets 402, page assets 404, module assets 406, show assets 408, and URL assets 401. For example, and staying with the example of a user requesting the ABC webpage, the ABC webpage might include five different modules. As such, each of the five modules would have a definition file that includes all of the assets needed for that module.

Furthermore, when collecting page information, there might be modules that are dependent on each other or assets that are required for two different modules. In this instance, collecting page information will remove the duplicated assets so that assets are not loaded twice.

After the page information has been collected, content plus page configuration begins (446). To begin content plus page configuration, a list of assets needed for each of the different modules is assembled. For example, a list would be assembled describing the assets needed for each of the five modules for the ABC webpage. Next, an asset dependency analysis is performed (448). The asset dependency analysis includes receiving load dependents 414, which lists how some assets depend on other assets. The asset dependency analysis also includes a list of which assets should be compacted.

After performing the asset dependency analysis, a second content plus page configuration occurs (450). In the second content plus page configuration, the dependencies are added to the list of assets needed for each of the different modules. For example, load dependents 414 would be added the list describing the assets needed for each of the five modules for the ABC.com webpage. Next, the assets are grouped and a placement analysis is conducted (452). Asset grouping includes grouping assets based on placement and location of the assets on the webpage. For example, assets can be grouped depending on if the assets are on the top of webpage, at the end of the webpage, or at a totally separate location that is based on the HTML. For the ABC webpage example described above, assets displayed on the top of the ABC webpage could be grouped together and assets displayed at the end of the ABC webpage could be grouped together. However, the present implementation is not just limited to grouping assets based on if the assets are on the top or end of the webpage. In other implementations, assets may be grouped using various grouping criteria.

After the asset grouping and placement analysis occurs, a tokenized asset list is generated (454). The tokenized asset list is generated based on the grouping of the similarly located assets, and includes combining the similarly located assets into one file. For example, all the assets located on the top of the ABC webpage would be grouped to one file and all of the assets located at the end of the ABC webpage would be grouped to a different file. Next, the tokenized asset list is saved to storage (456). For example, the tokenized asset list can be saved in memory cache 431 and AWS SDB 432 of memory 430. The tokenized asset list saved to the storage includes metadata describing the attributes of the specific assets.

After the tokenized list is saved in memory 430, the tokenized asset list (458) is finalized during finalizer assets rendering (460). Finalizer assets rendering includes replacing placeholders on the webpage with the tokenized URLs that are to be placed on the webpage. The URLs can be defined anywhere on the webpage and at the end of the request, the tokenized URLs will be replaced with the actual files that were previously created. For example, and staying with the ABC webpage example from above, placeholders on the ABC webpage would be replaced with the actual tokenized URLs. Finally, the webpage responds (462) and the asset loader stops (464).

Figure 5:
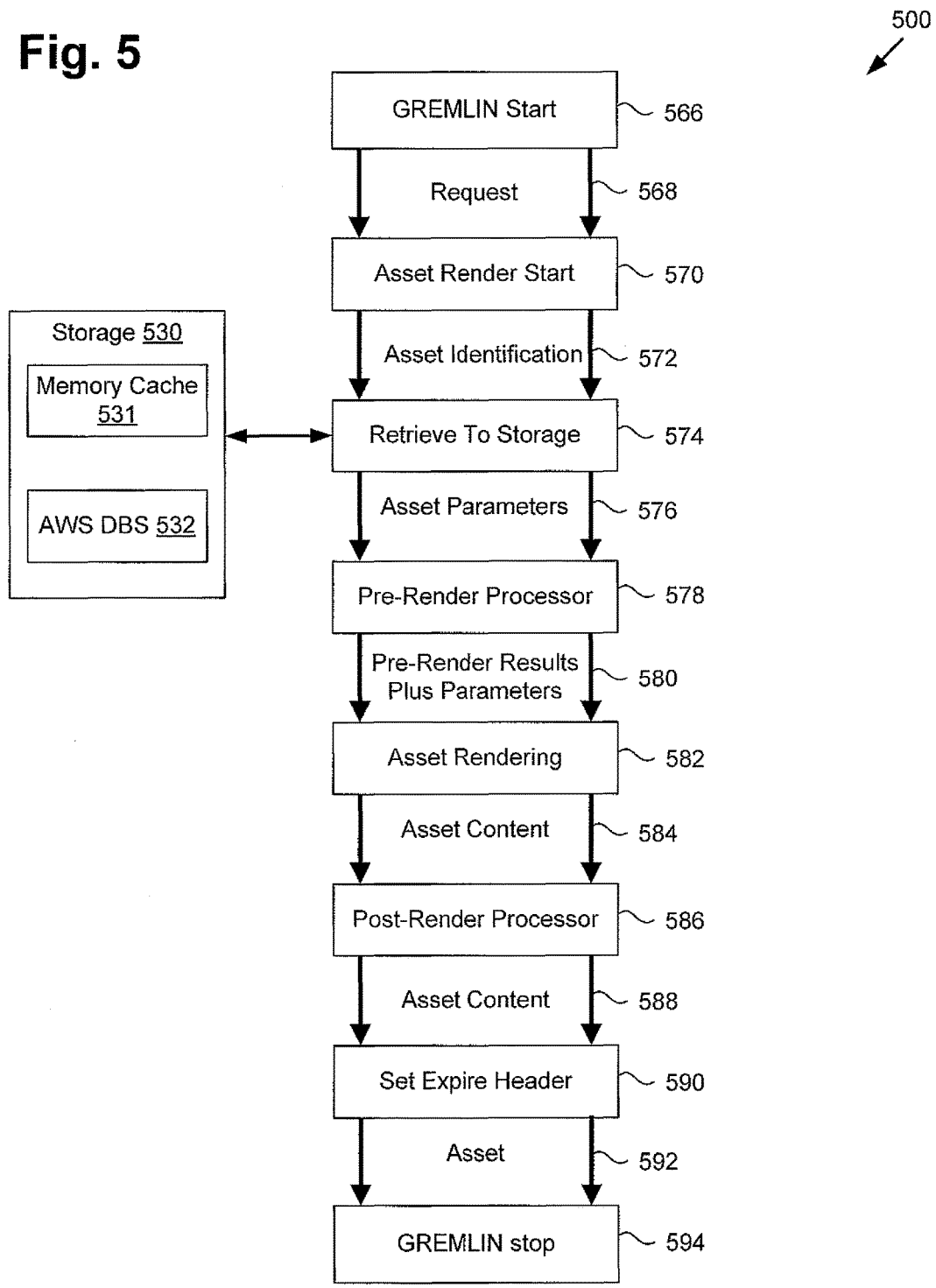
FIG. 5 presents a flowchart illustrating a method for translating a unique URL built by an assets loader, according to one implementation of the present disclosure.

FIG. 5 presents a flowchart illustrating a method for translating a unique URL built by an assets loader, according to one implementation of the present disclosure. Flowchart 500 is the second step to optimizing asset downloads for large complex websites and includes translating the URLs built by the asset loader into JavaScript content. Flowchart 500 occurs after the webpage has been loaded and the URLs have been added to the webpage, as described in the method of FIG. 5. Gremlin is the name given to the method of translating the URLs.

It should be noted that with regards to FIG. 5, memory 530, memory cache 531, and AWS SDB 532 correspond respectively to memory 430, memory cache 431, and AWS SDB 432 of FIG. 4.

Flowchart 500 includes starting the Gremlin process of translating the URLs built by the asset loader (566). First, a request is made (568) and the asset rendering starts (570). For example, the browser will try to find and fetch the external URLs that were previously loaded to the webpage, as discussed in reference to FIG. 4. This is when one of the tokenized URLs gets loaded to the webpage.

Next, the assets are identified (572) and the tokenized asset list is retrieved from storage (574). For example, in flowchart 400, the tokenized asset list was stored in the memory. This same tokenized asset list is then retrieved from memory cache 531 and AWS SDB 932 of memory 530.

After the tokenized asset list is retrieved from storage, the asset parameters are retrieved (576). As discussed above with flowchart 400, when storing the tokenized asset list in the memory, only the metadata about each asset was stored. As such, the asset parameters is a list of the metadata that was stored in memory 530. Next, the assets rendering begins, which includes the pre-render processor (578), pre-render results plus parameters (580), asset rendering (582), asset content (584), and a post-render processor (586). The assets rendering is an event-driven design. For example the pre-render processor and the post-render processor include a plug and play system. As such, users of the system can plug into the pre-render processor and the post-render processor as a plug-in so that the system is open for users to load assets.

After rendering of the assets, the asset content is loaded (588) and the header is set to expire (590). The expiration of the header controls how long the assets are good for before expiring. Finally, the assets are fully loaded to the webpage (592), which ends the Gremlin process (594). At this point, the webpage is fully loaded on the client device with displaying all the necessary assets.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for transporting content data client-side by a client device, the method comprising:
    retrieving the content data displayed on a display of the client device by a first webpage accessed by the client device;
    assembling a limited-time cookie using the content data displayed on the display of the client device by the first webpage;
    detecting a second webpage accessed by the client device;
    extracting the content data from the limited-time cookie, in response to the detecting;
    loading the content data extracted from the cookie on the second webpage; and
    displaying the loaded content data extracted from the limited-time cookie on the second webpage displayed on the display of the client device;
    wherein the limited-time cookie comprises an expiration value and a time to live value, and wherein extracting the content data from the limited-time cookie comprises decrementing the time to live value.

2. The method of claim 1, wherein before extracting the content data from the limited time cookie the method further comprises, storing the limited time cookie in a memory of the client device and retrieving the limited time cookie from the memory in response to the detecting of the second webpage.

3. The method of claim 2, further comprising deleting the limited time cookie from the memory in response to extracting the content data from the limited time cookie.

4. The method of claim 1, further comprising embedding, by a server of the first webpage, embedded data in the first webpage.

5. The method of claim 1, wherein detecting the second webpage includes navigating from the first webpage to the second webpage on the client device.

6. The method of claim 1, wherein the first webpage and the second webpage are accessed by the client device over a network.

7. The method of claim 1, wherein the content data includes at least one of an advertisement, image, text, video, link, game, an application.

8. A client device for client-side transportation of content data, the client device comprising:
    a display;
    a memory; and
    a processor configured to:
        retrieve the content data displayed on the display of the client device by a first webpage accessed by the client device;
        assemble a limited time cookie using the content data displayed on the display of the client device by the first webpage;
        detect a second webpage;
        extract the content data from the limited time cookie, in response to detecting;
        load the content data extracted from the limited time cookie on the second webpage; and
        display the loaded content data extracted from the limited time cookie on the second webpage displayed on the display of the client device;
        wherein the limited-time cookie comprises an expiration value and a time to live value, and wherein extracting the content data from the limited-time cookie comprises decrementing the time to live value.

9. The system of claim 8, wherein before extracting the content data from the limited-time cookie, the processor is further configured to store the limited-time cookie in the memory and retrieve the limited-time cookie from the memory in response to the detecting of the second webpage.

10. The system of claim 9, wherein the processor is further configured delete the limited-time cookie from the memory in response to extracting the content data from the limited-time cookie.

11. The system of claim 8, wherein a server embeds embedded data in the first webpage.

12. The system of claim 8, wherein detecting the second webpage includes navigating from the first webpage to the second webpage on the client device.

13. The system of claim 8, wherein the first webpage and the second webpage are accessed by the client device over a network.

14. The system of claim 8, wherein the content data includes at least one of an advertisement, image, text, video, link, game, an application.

* * * * *